United States Patent [19]

Komhyr

[11] 4,285,642
[45] Aug. 25, 1981

[54] PUMP PISTON CYLINDER ASSEMBLY WITH EXTERIOR RING SEALS

[76] Inventor: Walter D. Komhyr, 70 Manhattan Dr., Boulder, Colo. 80303

[21] Appl. No.: 74,560

[22] Filed: Sep. 11, 1979

[51] Int. Cl.³ ............................................. F04B 21/08
[52] U.S. Cl. ..................................... 417/465; 92/170
[58] Field of Search ................... 417/465, 464; 92/170

[56] References Cited

U.S. PATENT DOCUMENTS

| | | | |
|---|---|---|---|
| 1,088,608 | 2/1914 | Mitchell | 417/465 |
| 3,059,586 | 10/1962 | Brailsford | 417/465 |
| 3,242,869 | 3/1966 | Komhyr | 417/465 |
| 3,289,916 | 12/1966 | Hogg et al. | 417/465 |

FOREIGN PATENT DOCUMENTS 848441  9/1952  Fed. Rep. of Germany ............ 92/170

Primary Examiner—Carlton R. Croyle
Assistant Examiner—Edward Look
Attorney, Agent, or Firm—John E. Reilly

[57] ABSTRACT

A two-stroke piston pump includes an external piston cylinder seal by providing a flexible sidewall portion of the cylinder and an elastic O-ring sized to squeeze the flexible sidewall against the surface of the piston. The piston and piston cylinder are constructed of self-lubricating materials. The cylinder block is connected to a base plate which has inlet and outlet ports and as the piston reciprocates in the piston chamber, a single port communicating with the piston chamber shifts between the intake and exhaust ports to provide the pumping action.

22 Claims, 9 Drawing Figures

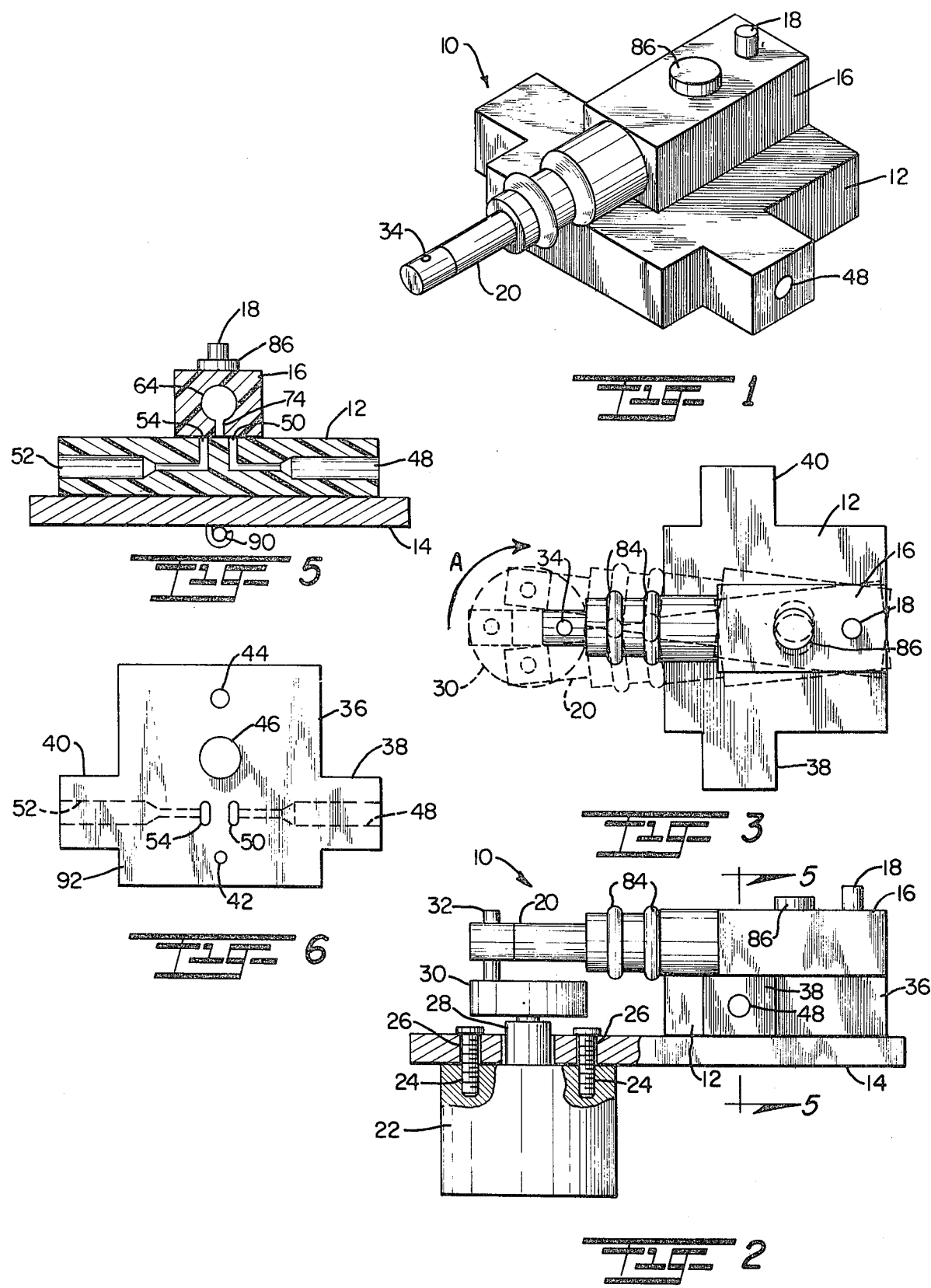

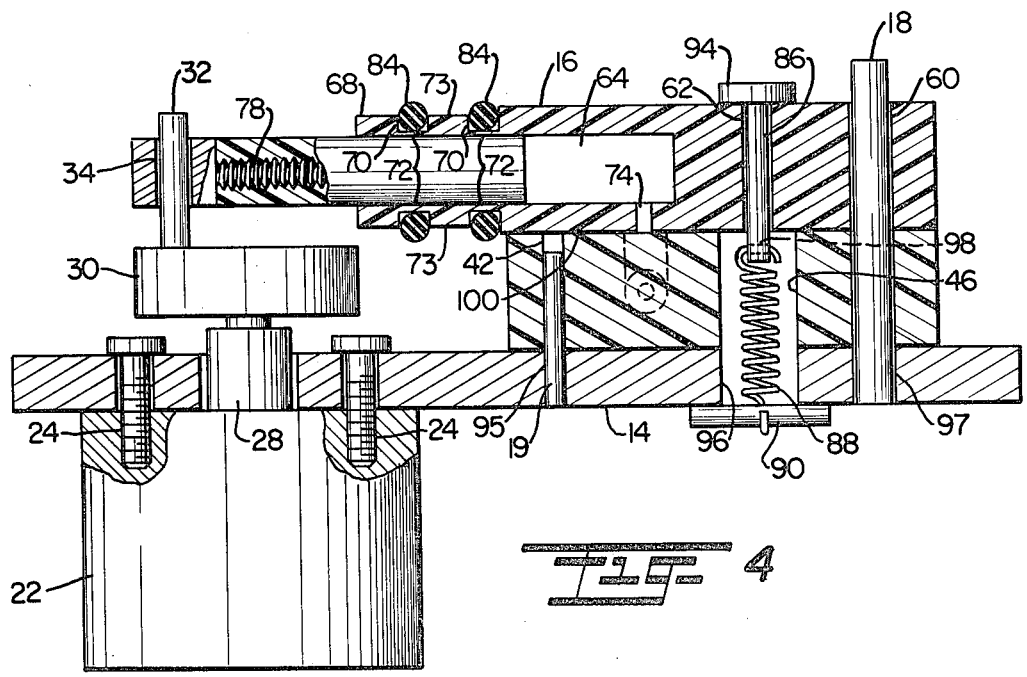
_FIG. 4_
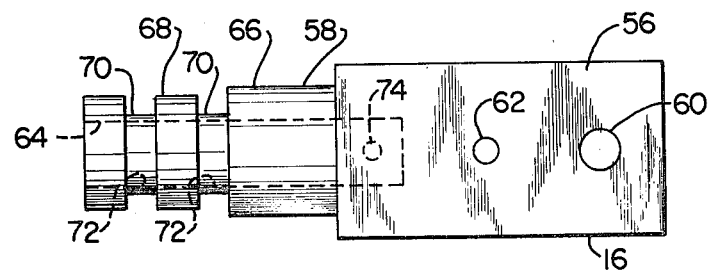
_FIG. 7_
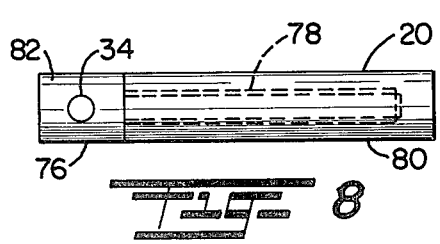
_FIG. 8_
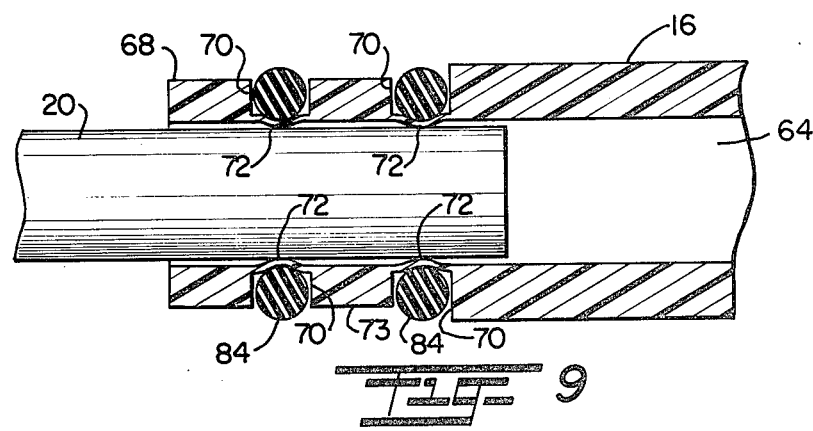
_FIG. 9_

4,285,642

PUMP PISTON CYLINDER ASSEMBLY WITH EXTERIOR RING SEALS

BACKGROUND OF THE INVENTION

The present invention relates to a novel and improved piston and cylinder for handling fluids such as liquids and gases, and more particularly relates to a piston pump which is particularly suited for purposes of retrieving samples of gaseous products without contamination, for example, by pump oil, for purposes of analysis. Other applications of the present improved apparatus are possible where small pressures need be developed, and the present apparatus is especially applicable where miniaturization of parts is desired, and indeed, the fluid handling apparatus is adaptable for valve structures or other uses requiring a reciprocating member to move in sealed relation to its housing.

One of the common problems associated with reducing the size of and number of parts for pumps has been the need for precision bearings and seals as found in the conventional pump. Furthermore, natural wear and tear deteriorates the component parts of the pump and replacement of standard bearings and seals is both difficult and expensive in most instances. Another problem arises due to non-uniform thermal expansion of the various working parts of the assembly.

The pump, and particularly the cylinder block and piston assembly, according to the present invention, removes these disadvantages by avoiding the need for internal piston rings. Further, as the piston and piston cylinder become worn, means are provided to maintain the necessary sealing contact so that maintenance problems are minimized. Also, because of the flexible nature of the piston cylinder seal, the problem of piston cylinder binding due to differential thermal expansion is avoided. Finally, the present invention avoids many of the problems in the prior art by greatly reducing the number of working parts of the apparatus so that a simplified pump is provided which is inexpensive to manufacture.

SUMMARY OF THE INVENTION

It is therefore an object of the present invention to provide a novel and improved piston cylinder assembly for handling various fluids wherein a seal is maintained by forcing the piston cylinder wall into contact with the surface of the piston member while minimizing wear and deterioration of parts.

Another object of the present invention is to provide a pumping apparatus having a minimum number of working parts including a seal constructed of self-lubricating or low coefficient friction, flexible material in such a way as to eliminate the need for common lubricants and the necessary seals and gaskets associated with the use of such lubricants.

It is a further object of the present invention to provide a means, externally of the piston cylinder, for maintaining the piston and the piston cylinder sidewall in a sealing relationship thereby providing a self-adjusting seal.

It is yet another object of the present invention to provide an improved two-stroke piston pump wherein the piston and the sidewall of the piston cylinder are squeezed by external means into a sealing relationship and which piston cylinder has a single fluid port that is alternately shifted between an intake and an exhaust port of a cylinder block support as the piston is reciprocated within the piston chamber.

In accomplishing these objectives, the preferred form of the present invention comprises a mounting plate to which is attached a support block or base member and an eccentric cam which is driven by a motor drive means. A piston cylinder block is pivotally attached to the base support and has a piston-receiving chamber which receives a piston connected to the eccentric cam. As the eccentric is rotated, the piston is reciprocated in the piston-receiving chamber and the cylinder block is pivoted so that the fluid port in the chamber is alternately positioned over an intake and exhaust port provided in the base support. The cylinder block and the base support are resiliently biased against one another so that a substantial seal is maintained in the area surrounding the fluid port and the intake and exhaust ports.

A unique feature of the present invention is found in the sealing arrangement between the piston member and the piston receiving chamber. To this end, it is necessary to construct the cylinder block and preferably the piston out of low coefficient of friction plastic or plastic-like material such as polytetrafluorethylene which possess at least limited flexibility. Further, a portion of the sidewall of the piston-receiving chamber is reduced in dimension or thickness so that it is flexible while the main body portion of the piston-receiving chamber is substantially rigid. Preferably, the piston and the piston-receiving chamber are both cylindrical and a pair of annular channels are provided around the cylinder block so that two areas of reduced cross-section are provided. A pair of elastic O-rings having a diameter slightly smaller than the diameter of these annular channels are placed therein so that they squeeze the sidewall into abutting relationship with the piston in the piston-receiving chamber. In this manner, the chamber is sealed by external means so that the need for internal piston rings and lubricants is thereby eliminated.

Other objects, advantages and features of the present invention will be readily apparent from the following detailed description of the preferred embodiment taken in conjunction with the accompanying drawings, in which:

BRIEF DESCRIPTION OF THE DRAWINGS

FIG. 1 is a perspective view of the pump mechanism according to the preferred embodiment of the present invention;

FIG. 2 is a side elevational view, partially in section, of the pump assembly and motor drive mechanism therefor according to the present invention;

FIG. 3 is a top plan view of the pump assembly according to the present invention showing the position of the assembly during one cycle of operation.

FIG. 4 is a side elevational view in partial cross-section showing the pump according to the present invention;

FIG. 5 is a cross-sectional view taken along lines 5—5 of FIG. 2;

FIG. 6 is a top plan view of the base support member according to the present invention;

FIG. 7 is a top plan view of the cylinder block according to the present invention;

FIG. 8 is a cross-sectional view of the piston member according to the present invention; and FIG. 9 is an enlarged view in partial cross-section of the end of the cylinder block with the piston member inserted therein according to the present invention.

DETAILED DESCRIPTION OF THE PREFERRED EMBODIMENT

The preferred embodiment of the present invention is an improved and novel reciprocal two-stroke pump assembly which includes a novel sealing arrangement between the piston and sidewall of the piston cylinder, but it should be appreciated that the scope of this invention includes a variety of fluid handling apparatus, such as, valve assemblies and the like, wherein it is desired that a movable member move in sealed relation to its housing.

As is shown in FIGS. 1 and 2, the preferred pump assembly 10 has a base member or support 12 which is attached to base plate 14 in any convenient manner. A cylinder block 16 is pivotally attached to support 12 by means of shaft 18. Piston member 20 is received by cylinder block 16 in telescoping relation. As is shown in FIG. 2, a drive means for pump assembly 10 comprises a motor 22 mounted to base plate 14 by a pair of screws 24 extending through bores 26 in base plate 14. Motor 22 has a shaft 28 which rotates to turn wheel 30 to which is attached a post 32. Wheel 30 and post 32 define an eccentric member to which piston 20 is mounted with this mounting being accomplished by means of a bore 34 extending through one end of piston member 20 with pump assembly 10 being mounted so that post 32 extends through bore 34 in piston member 20.

Support 12 is shown in greater detail in FIGS. 2 and 4–6. Support 12 is formed of a generally rectangular body 36 having a pair of arms 38 and 40 extending therefrom in opposite directions. Rectangular body 36 has a forward mounting bore 42 and a pair of rearward mounting bores 44 and 46 with mounting bores 44 and 46 extending completely through support 12. Further, arm 38 of support 12 has an inlet or intake passageway 48 which extends approximately halfway through support 12 in a direction transverse to that of bore 46. Inlet passageway 48 converges to a portion of reduced cross-section at its interior end and terminates in an upwardly extending inlet port 50 so that a generally L-shaped cavity is formed as shown in FIG. 5. Similarly, arm 40 has an outlet or exhaust passageway 52 which is coaxial with inlet passageway 48. Outlet passageway 52 extends approximately half of the way through support 12 in an opposite direction from that of passageway 48, converging to a portion of reduced cross-section at its interior end, and terminates in an outlet port 54 to define a generally L-shaped cavity as shown in FIG. 5. In this manner, inlet port 50 and outlet port 54 are formed in closely-spaced relation symmetrically about a line passing through mounting bore 44 and the midpoint between the inlet and outlet ports as shown in FIG. 6. Passageways 48 and 52 as well as inlet ports 50 and 54 cooperate with piston cylinder block 16 as described below.

Cylinder block 16 is best shown in FIGS. 2, 4, 5 and 7. As may be seen, cylinder block 16 is formed of a generally rectangular body portion 56 with generally cylindrical portion 58 extending therefrom. Body portion 56 has mounting bores 60 and 62 which cooperate with mounting bores 44 and 46, respectively, as described below.

An important feature of the present invention resides in the construction of piston-receiving cavity or chamber 64 which is formed in cylinder block 16 as shown in FIGS. 4, 7 and 9. In the preferred embodiment, chamber 64 is an elongated cylindrical bore extending along the longitudinal axis of cylinder block 16. The internal sidewall of chamber 64 is smooth and uninterrupted and is sized for close-fitting engagement with piston member 20. Cylindrical portion 58 has an enlarged base 66 which is attached to body portion 56 and a terminal portion 68 which is slightly smaller in diameter than base 66. A pair of annular channels 70 are formed to intrude from the outer surface of terminal portion 68 in closely-spaced, parallel relation to one another. Channels 70 define sidewall portions 72 which are of substantially lesser thickness than the remainder of the sidewall formed by terminal portion 68, base 66 and body portion 66 of cylinder block 16 and are separated by a narrow bridge of thicker wall portion 73.

The annular sidewall areas or portions 72 are of sufficiently reduced radial thickness so that they are substantially flexible when cylinder block 16 is constructed of the materials herein disclosed. To this end, it is important to form cylinder block 16 out of a material that is flexible when formed with relatively reduced dimensions but yet which is substantially rigid for thicker dimensions. In the case of cylinder block 16, the material selected is preferably polytetrafluorethylene, commonly referred to as TFE Teflon, filled with 15%–25% glass fibers. For this material, the thickness of the sidewall of chamber 64 as reduced by channels 70 generally depends on pump size. For a miniature pump having a piston cylinder displacement of a fraction of a cubic centimeter, for example, an appropriate thickness for the area of reduced cross-section 72 is about 0.015" or 0.04 cm. For larger pumps, thicker areas of reduced cross-section are appropriate since flexibility is then retained by increasing the width of channels 70. Depending on pumping or valving applications, other self-lubricating materials can be used for fabrication of the piston cylinder, for example, pure TFE Teflon, Teflon FEP, and polyethylene.

Cylinder block 16 has an outwardly opening fluid port 74 which is in fluid communication with chamber 64 at the interior end thereof. When mounted on support 12 as hereinafter described, fluid port 74 is disposed so as to communicate with inlet port 50 and outlet port 54 of support 12 so that a fluid communication path is established between chamber 64 and inlet passageway 48 or outlet passageway 52 as cylinder block 16 undergoes pivotal or oscillatory motion on support 12.

Piston member 20 is likewise preferably formed of polytetrafluorethylene containing 15%–25% glass fibers, as described with respect to cylinder block 16, and is sized for close-fitting telescopic insertion into chamber 64. Materials other than TFE Teflon reinforced with glass fibers can be used for fabrication of the pump piston, for example, brass, stainless steel, or glass, particularly if the material of the piston cylinder is TFE Teflon reinforced with glass fibers.

Since it is important that piston member 20 be substantially rigid, a metal insert 76 may be provided as shown in FIG. 8. Metal insert 76 includes a shaft or shank portion 78 which extends along the longitudinal axis of piston member 20, and may extend for substantially the length of polytetrafluorethylene mass 80 as shown in FIG. 8 or may extend only partially therethrough. By extending shank 78 substantially the length of piston member 20, greater rigidity is provided while also providing a more suitable bonding surface for mass 80. Further, in the preferred form of the present invention, shank 78 is threaded to enhance the mechanical bonding of mass 80 to metal insert 76. Metal insert 76 has an enlarged head 82 which is provided with bore 34 as discussed above, and it is bore 34 which connects piston member 20 to the eccentric cam drive formed by wheel 30 and post 32. As shown in FIGS. 2 and 4, when pump assembly 10 is assembled, bore 34 receives post 32 so that the turning of wheel 30 will drive piston member 20 reciprocally in chamber 64.

As noted above, a principal departure of the present invention from the prior art resides in the manner in which piston member 20 is maintained in substantially sealed relationship with the sidewall of chamber 64. To accomplish this seal, a pair of flexible, resilient O-rings 84 are mounted in each of channels 70. Expandible O-rings 84 are of slightly smaller diameter than the diameter of the annular cutout portions defined by channels 72 and are preferably of a diameter approximating the diameter of piston member 20, so that, when expanded and placed in channel 72, O-rings 84 deform the area of reduced cross-section 72 so that it is forcibly collapsed or squeezed radially inwardly of chamber 64. When piston member 20 is inserted into chamber 64, areas of reduced crosssection 72 form annular seals with piston member 20 by being forced against its external sidewall.

As shown in FIGS. 1, 2 and 4, cylinder block 16 is mounted on support 12 which in turn is attached to base plate 14. Referring to FIG. 4, it may be seen that this mounting is accomplished by means of shafts 18 and 19 and pin 86 in conjunction with spring 88 and crossbar 90. Specifically, piston chamber 16 has a lower surface 100 positioned on upper surface 92 of support 12 and is mounted by means of shaft 18 which extends through mounting bore 60 of piston cylinder 16 and through mounting bore 44 of support 12. Shaft 18 also extends through bore 97 formed in base plate 14, and bores 44 and 97 are sized so that shaft 18 is pressfit therein. Shaft 18 and bores 44, 97 and 60 therefore define a pivotal mount for cylinder block 16 so that it may pivot with respect to support 12 about mounting shaft 18. It should be noted that shaft 18 may be affixed to a selected one of piston cylinder 16 and support 12 so long as freely pivotal motion is allowed. A second shaft 19 is pressfit in bore 42 of support 12 and in bore 95 formed in base plate 14. Shaft 19 then acts as an anchor pin mounting support 12 to base plate 14.

To complete the attachment, a pin 86 extends through mounting bore 62 of piston cylinder 16 until its upper head portion 94 abuts the upper surface of the piston cylinder. Piston cylinder 16 is then securely biased into contact with upper surface 92 of support 12 by means of spring 88 which is attached to one end of pin 86. Spring 88 extends through mounting bore 46 of support 12 and through a complementary bore 96 formed in base plate 14 so that it is coextensive with bore 46. Spring 88 may then be attached to crossbar 90 which abuts base plate 14 on a side opposite support 12. Spring 18 is slightly extended so that a constant force then biases piston cylinder 16 and base 12 together.

It should be appreciated that the abovedescribed mounting of piston cylinder 16 to base 12 allows for pivotal motion while maintaining contact therebetween. For this reason, bores 46 and 96 should be constructed of sufficient diameter to allow some degree of movement of end 98 of pin 96 as this pivotal motion occurs. Specifically, where D represents the distance between motor shaft 28 and shaft 18, and shaft R represents the distance between the center of wheel 30 (with shaft 28 being centered thereon) and post 32, and d represents the distance between shaft 18 and pin 86, then it may be seen that end 98 of pin 86 will have a total distance of travel, t, that is 2Rd/D. Hence, bores 46 and 96 should have diameters dimensioned to allow spring 88 to travel this distance therein.

The motion of pump assembly 10 and particularly cylinder block 16 and piston member 20 may best be seen in FIG. 3. As shown, as wheel 30 is rotated in the direction of arrow A from the position shown in FIGS. 2 and 4, piston member 20 is driven into chamber 64 for one-half of the cycle of rotation, while, at the same time, cylinder block 16 is pivoted from the line of symmetry in a direction to the left, as shown in FIG. 5, so that fluid port 74 is advanced into communication with outlet port 54 and the fluid contents of chamber 64 may be exhausted through outlet passageway 52. As the clockwise rotation of wheel 30 continues, piston member 20 is withdrawn from chamber 64 and piston cylinder 16 is advanced so that fluid passageway 74 communicates with inlet port 50 allowing fluid to be drawn in through inlet passageway 48 and into chamber 64 as a result of the negative pressure created by the withdrawal of piston member 20. To create this negative pressure, then, it should be appreciated that a substantial seal must exist between piston member 20 and the sidewall of chamber 64 as well as between the piston cylinder 16 and base member 12 along their adjacent surfaces. The first seal is accomplished, as described before, by providing O-rings 84 which collapse the sidewall of chamber 64 while the seal between piston cylinder 16 and support 12 is accomplished by constructing their abutting surfaces so that they are substantially planar. Since it is intended that the present invention be applied primarily to a pumping system not requiring high pressures, it has been found that the biasing of surface 100 of piston cylinder 16 into contact with surface 92 of support 12 provides a sufficient seal for pumping to occur. For high pressure applications, the increase in the tension of spring 88 will increase the effectiveness of the seal between surfaces 92 and 100.

Since reduced friction between piston member 20 and chamber 64 as well as between cylinder block 16 and base 12 is desired, it is necessary that the cylinder block be fabricated from a plastic or similar propertied material. In the preferred form of the present invention, both the cylinder block and base are fabricated from essentially pure polytetrafluorethylene (Teflon) or polytetrafluorethylene reinforced with glass fibers as noted above with respect to piston member 20 and cylinder block 16. This material is selected because of its low friction characteristics as well as its ease of fabrication. Furthermore, it is necessary that the material employed for cylinder block 16 exhibit the flexible properties described above, and Teflon does meet this requirement. Other materials are readily adaptable to a piston assembly constructed according to the present invention, and of particular adaptability are plastics such as polyethylene. Indeed, it is possible to use material such as stainless steel, brass or glass for the piston so long as a portion of the sidewall of piston chamber 64 is sufficiently flexible that it can be deformed by O-rings 84. It is also preferred that the material selected for fabrication of pump assembly 10 be inert to most chemicals so that a variety of fluids, either in liquid or gas phase, may be pumped.

For miniature pumps constructed according to the present invention, it has been found that satisfactory operation is achieved where chamber 64 is cylindrical with a diameter of approximately 0.156" with piston member 20 also being cylindrical with approximately the same diameter so that piston member 20 may freely slide in chamber 64 while maintaining close-fitting contact with the smooth, uninterrupted sidewall thereof. Cylindrical portion 58 is formed having a diameter of approximately 0.282" while terminal portion 68 has a diameter at its largest point of approximately 0.25". Channels 70 are then formed in terminal portion 68 and are approximately 0.032" in depth with a width of approximately 0.078" with the pair of channels 70 being spaced apart approximately 0.078". In this manner, then, sidewall portions 72 are approximately 0.015" thick so that they may be deformed by O-rings 84 while cylindrical portion 58 and terminal portions 68 remain substantially rigid. Main body portion 56 of piston cylinder 16 is preferably 0.30" thick with a lateral width of 0.375" and a longitudinal width of 0.75". On the other hand, piston member 20 is preferably on the order of 0.9" in length, with chamber 64 having a total depth of approximately 0.70". It has been found that, with the above construction of piston member 20 and piston cylinder 16, O-rings 84 may be of the common size 2-007 and constructed of an expandible rubber or rubber-like material.

As noted, TFE Teflon may be employed in the construction of the pump assembly according to the present invention, and other materials are also suitable. It is desirable that these materials be "self-lubricating", that is, requiring no lubrication due to their relatively low coefficient of friction. As is well understood, however, the frictional force will be dependent on the load of the system which, in the present case, results from the force of compression of the O-rings. While good results are achieved when the material under a selected compression has a relatively low coefficient of friction, preferably less than or equal to 0.5, best results have been achieved where the coefficient of friction is less than 0.3. Indeed, the limits are dependent upon the specific design of the pump assembly and the operating speeds at which it is to be operated. In the preferred embodiment, then, 15% reinforced TFE Teflon has a dynamic coefficient of friction of 0.14 while 25% reinforced TFE Teflon has a dynamic coefficient of friction of 0.16.

It should be appreciated from the foregoing description of the preferred embodiment, that, no extensive lubrication should be necessary of the working parts of the pump assembly 10, and indeed, the pump may operate with no further lubrication whatsoever when constructed of polytetrafluorethylene. Further, maintenance is reduced since, as piston member 20 wears against the sidewall of chamber 64, external O-rings 84 will maintain constant contact between piston member 20 and the sidewall of chamber 64. Hence, the apparatus self-corrects for wear and tear occurring during operation. The further problem of non-uniform thermal expansion is also eliminated by this external, self-adjusting seal.

It should be noted, furthermore, that use of pure or reinforced Teflon TFE for the pump materials is highly desirable since these materials are highly chemically inert. Thus, contamination or destruction of even highly reactive pumped trace gases such as ozone does not occur. Because these self-lubricating materials and the pump design eliminate the requirement of oiling the piston cylinder assemblies, possible contamination of pumped trace gases by oil is also avoided.

Although the present invention has been described with particularity relative to the foregoing detailed description of the preferred embodiment, various modifications, changes, additions and applications other than those specifically mentioned herein will be readily apparent to those having normal skill in the art without departing from the spirit and scope of this invention.

I claim:

1. In fluid handling apparatus and the like, the improvement comprising:
    an elongated piston member;
    a cylinder block having a piston-receiving chamber formed therein, a sidewall in surrounding relation to said chamber and a fluid port communicating with said chamber, the sidewall of said chamber having an annular portion of reduced thickness in contact with said piston member being composed of a flexible, low coefficient of friction material and sized for close-fitting engagement with said piston member; and
    sealing means associated with said flexible annular portion for forcing said flexible annular portion into contact with the surface of said piston member around the perimeter of the piston member.

2. In fluid handling apparatus and the like according to claim 1 wherein said flexible portion of said cylinder block is composed of a self-lubricating material.

3. In fluid handling apparatus and the like according to claim 2 wherein said self-lubricating material is polytetrafluorethylene.

4. In fluid handling apparatus and the like according to claim 3 wherein said polytetrafluorethylene includes glass fibers in the proportion of about 15% to about 25% by weight.

5. In fluid handling apparatus and the like according to claim 1 wherein said annular portion of said sidewall is defined by a channel cut in the external surface of said cylinder block to form an area of reduced thickness, said cylinder block being constructed of a material that is substantially rigid at all portions except said area of reduced thickness.

6. In fluid handling apparatus and the like according to claim 5 wherein a pair of said channels are cut in the external surface of said cylinder in parallel spaced-apart relation to one another.

7. In fluid handling apparatus and the like according to claim 6 wherein said sealing means is a pair of elastic O-rings mounted in said channels and extending around the external surface of said cylinder block.

8. In a pump, the improvement comprising:
    a piston member;
    a cylinder block constructed of a low coefficient of friction material and having an elongated piston-receiving chamber with a smooth uninterrupted sidewall formed therein, and a first channel intruding from the external surface of said cylinder block to define a sidewall portion of reduced cross-section for said chamber, said sidewall portion being flexible and said piston member configured for close-fitting telescopic insertion into said chamber; and
    sealing means associated with said channel and said sidewall portion for deforming said sidewall portion into sealing engagement with the surface of said piston member.

9. In a pump according to claim 8, said cylinder block having a second channel extending around its perimeter in spaced-apart relation to said first channel, said sealing means being a pair of expandable O-rings each mounted in one of said first and second channels, each O-ring having an inner circumference smaller than the circumference of its respective said channel.

10. In a pump according to claim 8, said cylinder block having an outwardly opening passageway which communicates with said piston-receiving chamber at one end thereof.

11. In a pump according to claim 10, wherein said first channel is located adjacent a second end of said piston-receiving chamber opposite said one end, said piston member being longer than said piston-receiving chamber and constructed of a low coefficient of friction material.

12. In a pump according to claim 8 wherein said low coefficient of friction material includes a major proportion of polytetrafluorethylene.

13. A pump assembly comprising:
a support member;
a base member mounted on said support member;
a cylinder block pivotally mounted on said base member and having a piston-receiving chamber therein, said piston-receiving chamber having a longitudinal axis aligned with the point of pivotal mounting of said cylinder block and said base member, and a fluid port communicating with said piston-receiving chamber, said fluid port having an externally opening mouth, said base member having an inlet passageway and an outlet passageway with an inlet port and an outlet port respectively disposed in closely spaced-apart relation symmetrically about a line through said point of pivotal mounting and the midpoint between said inlet and outlet ports;
biasing means for biasing said cylinder block and said base member into abutment;
a rotatable eccentric member mounted on said support member proximate one end of said cylinder block;
a piston having a portion at a first end thereof positioned in said piston-receiving chamber and connected at a second end thereof opposite said first end to said eccentric member, said piston-receiving chamber having a flexible sidewall portion of reduced thickness positioned adjacent to the surface of said piston and extending transversely of and in surrounding relation to said piston;
resilient compressing means in surrounding relation to said flexible sidewall portion for deforming said flexible sidewall portion uniformly into contact with the surface of said piston member; and
drive means for rotatably driving said eccentric member whereby said piston member is reciprocated in said piston-receiving chamber and said cylinder block is pivoted on said base member between points whereby said mouth of said fluid port is alternately positioned in communication with said inlet and outlet ports.

14. A pump according to claim 13 wherein said piston-receiving chamber is cylindrically shaped and wherein said piston member has a cylindrical portion adapted for insertion into said piston-receiving chamber, said compression means being an O-ring having a diameter approximating the diameter of the cylindrical portion of said piston member and mounted on the external sidewall of said piston-receiving chamber.

15. A pump according to claim 14 wherein said biasing means includes a pin extending through said cylinder block and a spring attached at a first end to said pin and at a second end in fixed relation to said base plate.

16. A pump according to claim 15 wherein said rotatable eccentric member includes a wheel having an upright post adjacent its rim, said piston member including a bore adapted to receive said post.

17. A pump according to claim 13 wherein said cylinder block is formed of a plastic material.

18. A pump according to claim 17 wherein said plastic material includes polytetrafluorethylene.

19. A pump according to claim 18 wherein said cylinder block is constructed of a material including glass fibers.

20. A pump according to claim 13 wherein said piston has an external surface formed of material including polytetrafluorethylene.

21. A pump assembly comprising:
a base member having an intake passageway and an exhaust passageway;
a cylinder block mounted on said base member, said cylinder block and said base member including matching sealing surfaces abutting one another, said intake and exhaust passageways having an intake port and an exhaust port respectively disposed in closely spaced-apart relation on said sealing surface of said base member, said cylinder block including an elongated cylindrical portion having an elongated cylindrical chamber formed therein, said chamber having a smooth uninterrupted sidewall, an end wall and a circular opening opposite said end wall, said cylindrical block having a fluid port with an externally opening mouth on its sealing surface and with an internally opening mouth in fluid communication with said chamber adjacent said end wall;
said base member and said cylinder block being formed of a plastic-like material having a coefficient of friction less than 0.5, and said cylindrical portion having first and second outwardly opening channels formed therein in closely spaced-apart relation therearound with one of said channels adjacent said circular mouth, said channels defining flexible annular sidewall portions of said sidewall;
a cylindrical piston adapted for close-fitting insertion in said chamber;
an O-ring in each of said channels of sufficient dimension to collapse said annular sidewall portions radially inwardly against the cylindrical sidewall of said piston; and
drive means for driving said piston and said cylinder block whereby said piston is reciprocated in said chamber and said externally opening mouth is alternatively positioned in communication with said intake port and said exhaust port during each cycle of the piston's motion.

22. In fluid handling apparatus and the like, the improvement comprising:
an elongated piston member;
a cylinder block having a piston-receiving chamber formed therein and a fluid port communicating with said chamber, a portion of the sidewall of said chamber in contact with said piston member being composed of a flexible, low coefficient of friction material and sized for close-fitting engagement with said piston member; and
sealing means in the form of an elastic O-ring extending around the external surface of said flexible portion of said cylinder block whereby to force said flexible portion into contact with the surface of said piston member around the perimeter of said piston member.

* * * * *